(12) United States Patent
Bennington et al.

(10) Patent No.: US 12,007,510 B2
(45) Date of Patent: Jun. 11, 2024

(54) SYSTEM AND METHOD FOR DIFFERENTIAL COMPARATOR-BASED TIME-OF-FLIGHT MEASUREMENT WITH AMPLITUDE ESTIMATION

(71) Applicant: LG INNOTEK CO., LTD., Seoul (KR)

(72) Inventors: Dane Bennington, Pittsburgh, PA (US); Michel Laverne, Pittsburgh, PA (US)

(73) Assignee: LG INNOTEK CO., LTD., Seoul (KR)

( * ) Notice: Subject to any disclaimer, the term of this patent is extended or adjusted under 35 U.S.C. 154(b) by 431 days.

(21) Appl. No.: 17/494,175

(22) Filed: Oct. 5, 2021

(65) Prior Publication Data

US 2023/0109392 A1 Apr. 6, 2023

(51) Int. Cl.
*G01S 7/4865* (2020.01)
*B60W 60/00* (2020.01)
*G01S 7/481* (2006.01)
*G01S 17/931* (2020.01)

(52) U.S. Cl.
CPC ......... *G01S 7/4865* (2013.01); *B60W 60/001* (2020.02); *G01S 7/4813* (2013.01); *G01S 7/4816* (2013.01); *G01S 7/4817* (2013.01); *G01S 17/931* (2020.01); *B60W 2420/408* (2024.01)

(58) Field of Classification Search
CPC ...... G01S 7/4865; G01S 7/4873; G01S 17/93; B60W 60/001; H03F 2200/78
See application file for complete search history.

(56) References Cited

U.S. PATENT DOCUMENTS

| | | | |
|---|---|---|---|
| 5,663,731 | A | 9/1997 | Theodoras, II et al. |
| 10,852,401 | B2 | 12/2020 | Koyama et al. |
| 2018/0306926 | A1 | 10/2018 | LaChapelle et al. |
| 2019/0181171 | A1 | 6/2019 | Tadmor et al. |

FOREIGN PATENT DOCUMENTS

| | | |
|---|---|---|
| KR | 1020180064826 A | 6/2018 |
| KR | 1020180130381 A | 12/2018 |
| KR | 1020200056201 A | 5/2020 |

*Primary Examiner* — Maurice C Smith
(74) *Attorney, Agent, or Firm* — Birch, Stewart, Kolasch & Birch, LLP

(57) ABSTRACT

A signal delay component may be configured to receive a LiDAR output signal including an analog waveform from a LiDAR system, and provide a time-delayed LiDAR output signal including a time-delayed analog waveform. A differential comparator may be configured to receive the LiDAR output signal including the analog waveform and the time-delayed LiDAR output signal including the time-delayed analog waveform, and to provide a digital output signal. A processor may be configured to generate LiDAR data including a distance associated with the LiDAR output signal and an amplitude associated with the LiDAR output signal, the distance being based on a first time associated with a rising edge of the digital output signal, and the amplitude being based on a time difference between the first time associated with the rising edge of the digital output signal and a second time associated with a falling edge of the digital output signal.

20 Claims, 8 Drawing Sheets

SYSTEM AND METHOD FOR DIFFERENTIAL COMPARATOR-BASED TIME-OF-FLIGHT MEASUREMENT WITH AMPLITUDE ESTIMATION

BACKGROUND

1. Field

This disclosure relates generally to time-of-flight systems and, in some non-limiting embodiments or aspects, to differential comparator-based time-of-flight systems with amplitude estimation.

2. Technical Considerations

The time-of-flight principle is an imaging technique that can be used to resolve the distance between a sensor and an object. Time-of-flight systems typically operate by measuring the time difference between the emission of a signal and its return to the sensor after being reflected by an object. Time-of-flight systems may depend upon precise timing of waveform detection via digitization or thresholding. Digitization (e.g., high-speed analog-to-digital converters (ADC), etc.) may be very expensive and generate large amounts of data, most of which is useless, and, depending on the optical technology applied, digitization may require enormous dynamic range. Thresholding may be inexpensive and very precise, but thresholding eliminates information about by how much the received signal exceeds the threshold, which makes amplitude estimation very difficult. For example, although some techniques for amplitude estimation in thresholding do exist, these techniques are not very precise, and they fall prey to pulse pileup issues.

SUMMARY

Accordingly, provided are improved systems, methods, products, apparatuses, and/or devices for differential comparator-based time-of-flight measurement with amplitude estimation.

Non-limiting embodiments or aspects are set forth in the following numbered clauses:

Clause 1. A system, comprising: a signal delay component configured to: receive, at a delay input, a LiDAR output signal including an analog waveform from a LiDAR system, and provide, at a delay output, a time-delayed LiDAR output signal including a time-delayed analog waveform; a differential comparator configured to: receive, at a first comparator input, the LiDAR output signal including the analog waveform, receive, at a second comparator input, the time-delayed LiDAR output signal including the time-delayed analog waveform, and provide, at a comparator output, a digital output signal; and at least one processor configured to generate LiDAR data including a distance associated with the LiDAR output signal and an amplitude associated with the LiDAR output signal, the distance being based on a first time associated with a rising edge of the digital output signal, and the amplitude being based on a time difference between the first time associated with the rising edge of the digital output signal and a second time associated with a falling edge of the digital output signal.

Clause 2. The system of clause 1, wherein the signal delay component includes a delay line.

Clause 3. The system of clauses 1 or 2, wherein at least one of a hysteresis of the differential comparator and the time-delayed LiDAR output signal including the time-delayed analog waveform is biased in a positive direction.

Clause 4. The system of any of clauses 1-3, further comprising: a time-to-digital converter (TDC) configured to determine the first time and the second time.

Clause 5. The system of any of clauses 1-4, further comprising: the LiDAR system, wherein the LiDAR system includes a receiver unit configured to receive light, and generate, based on the received light, the LiDAR output signal including the analog waveform.

Clause 6. The system of any of clauses 1-5, further comprising: a signal splitter configured to receive, at a splitter input, the LiDAR output signal including the analog waveform, provide, at a first splitter output, connected to the first comparator input, the LiDAR output signal including the analog waveform, and provide, at a second splitter output connected to the delay input, the LiDAR output signal including the analog waveform.

Clause 7. The system of any of clauses 1-6, wherein the at least one processor is further configured to: detect, based on the LiDAR data, an object in an environment surrounding a LiDAR system.

Clause 8. The system of any of clauses 1-7, wherein the at least one processor is further configured to: issue a command to control, based on the detected object, at least one autonomous driving operation of an autonomous vehicle.

Clause 9. The system of any of clauses 1-8, further comprising: at least one photodetector configured to receive light reflected back into the LiDAR system, wherein the at least one photodetector is configured to generate the LiDAR output signal including the analog waveform.

Clause 10. A method, comprising: generating, with a signal delay component, based on a LiDAR output signal including an analog waveform, a time-delayed LiDAR output signal including a time-delayed analog waveform; generating, with a differential comparator, based on the LiDAR output signal including the analog waveform and the time-delayed LiDAR output signal including the time-delayed analog waveform, a digital output signal; and generating, with at least one processor, LiDAR data including a distance associated with the LiDAR output signal and an amplitude associated with the LiDAR output signal, the distance being based on a first time associated with a rising edge of the digital output signal, and the amplitude being based on a time difference between the first time and a second time associated with a falling edge of the digital output signal.

Clause 11. The method of clause 10, wherein the signal delay component includes a delay line.

Clause 12. The method of clauses 10 or 11, wherein at least one of a hysteresis of the differential comparator and the time-delayed LiDAR output signal including the time-delayed analog waveform is biased in a positive direction.

Clause 13. The method of any of clauses 10-12, further comprising: determining, with a time-to-digital converter (TDC), the first time associated with the rising edge of the digital output signal and the second time associated with the falling edge of the digital output signal.

Clause 14. The method of any of clauses 10-13, further comprising: receiving, with a receiver unit of a LiDAR system, light; and generating, with the receiver unit, based on the received light, the LiDAR output signal including the analog waveform.

Clause 15. The method of any of clauses 10-14, further comprising: receiving, with a signal splitter, at a splitter input, the LiDAR output signal including the analog waveform; providing, with the signal splitter, a first splitter output, connected to a first comparator input, the LiDAR output signal including the analog waveform; and providing, with the signal splitter, at a second splitter output connected to a delay input, the LiDAR output signal including the analog waveform.

Clause 16. The method of any of clauses 10-15, further comprising: detecting, based on the LiDAR data, an object in an environment surrounding the LiDAR system.

Clause 17. The method of any of clauses 10-16, further comprising: issuing, with the at least one processor, based on the LiDAR data, a command to control at least one autonomous driving operation of an autonomous vehicle.

Clause 18. The method of any of clauses 10-17, further comprising: receiving, with at least one photodetector, light reflected back into a LiDAR system; and generating, with the at least one photodetector, the LiDAR output signal including the analog waveform.

Clause 19. An autonomous vehicle, comprising: a LiDAR system configured to generate a LiDAR output signal including an analog waveform; a signal delay component configured to: receive, at a delay input, the LiDAR output signal including the analog waveform, and provide, at a delay output, a time-delayed LiDAR output signal including a time-delayed analog waveform; a differential comparator configured to: receive, at a first comparator input, the LiDAR output signal including the analog waveform, receive, at a second comparator input, the time-delayed LiDAR output signal including the time-delayed analog waveform, and provide, at a comparator output, a digital output signal; and at least one processor configured to: generate LiDAR data including a distance associated with the LiDAR output signal and an amplitude associated with the LiDAR output signal, the distance being based on a first time associated with a rising edge of the digital output signal, and the amplitude being based on a time difference between the first time and a second time associated with a falling edge of the digital output signal; detect, based on the LiDAR data, an object in an environment surrounding the autonomous vehicle; and issue, based on the detected object, a command to control at least one autonomous driving operation of the autonomous vehicle.

Clause 20. The autonomous vehicle of clause 19, wherein the LiDAR system includes a receiver unit configured to receive light, and generate, based on the received light, the LiDAR output signal including the analog waveform.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
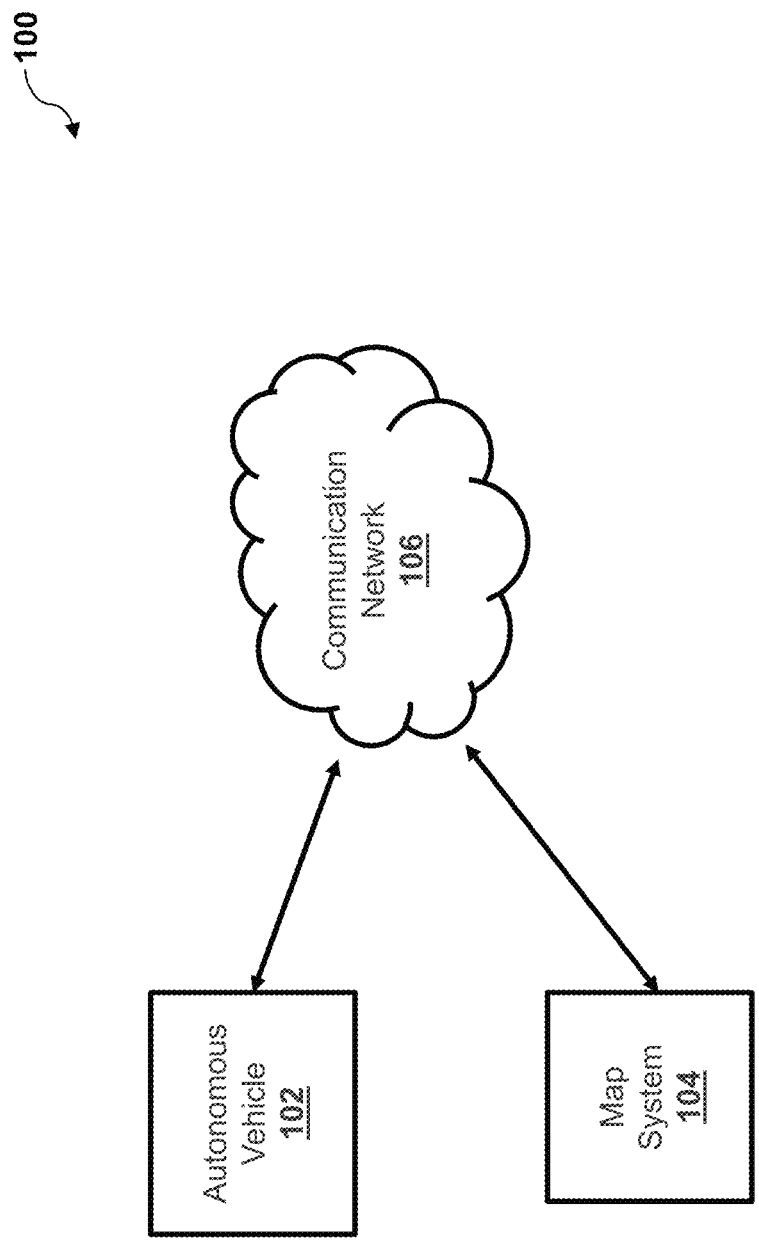
FIG. 1 is a diagram of non-limiting embodiments or aspects of an environment in which systems, methods, products, apparatuses, and/or devices, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

Referring now to FIG. 1, FIG. 1 is a diagram of an example environment 100 in which systems, methods, products, apparatuses, and/or devices described herein, may be implemented. As shown in FIG. 1, environment 100 may include autonomous vehicle 102, map system 104, and/or communication network 106.

Autonomous vehicle 102 may include one or more devices capable of receiving information and/or data from map system 104 via communication network 106 and/or communicating information and/or data to map system 104 via communication network 106. For example, autonomous vehicle 102 may include a computing device, such as a server, a group of servers, and/or other like devices.

Map system 104 may include one or more devices capable of receiving information and/or data from autonomous vehicle 102 via communication network 106 and/or communicating information and/or data to autonomous vehicle 102 via communication network 106. For example, map system 104 may include a computing device, such as a server, a group of servers, and/or other like devices.

Communication network 106 may include one or more wired and/or wireless networks. For example, communication network 106 may include a cellular network (e.g., a long-term evolution (LTE) network, a third generation (3G) network, a fourth generation (4G) network, a fifth generation (5G) network a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. For example, autonomous vehicle 102 may incorporate the functionality of map system 104 such that autonomous vehicle 102 can operate without communication to or from map system 104. Additionally, or alternatively, a set of devices and/or systems (e.g., one or more devices or systems) of environment 100 may perform one or more functions described as being performed by another set of devices and/or systems of environment 100.

Figure 2:
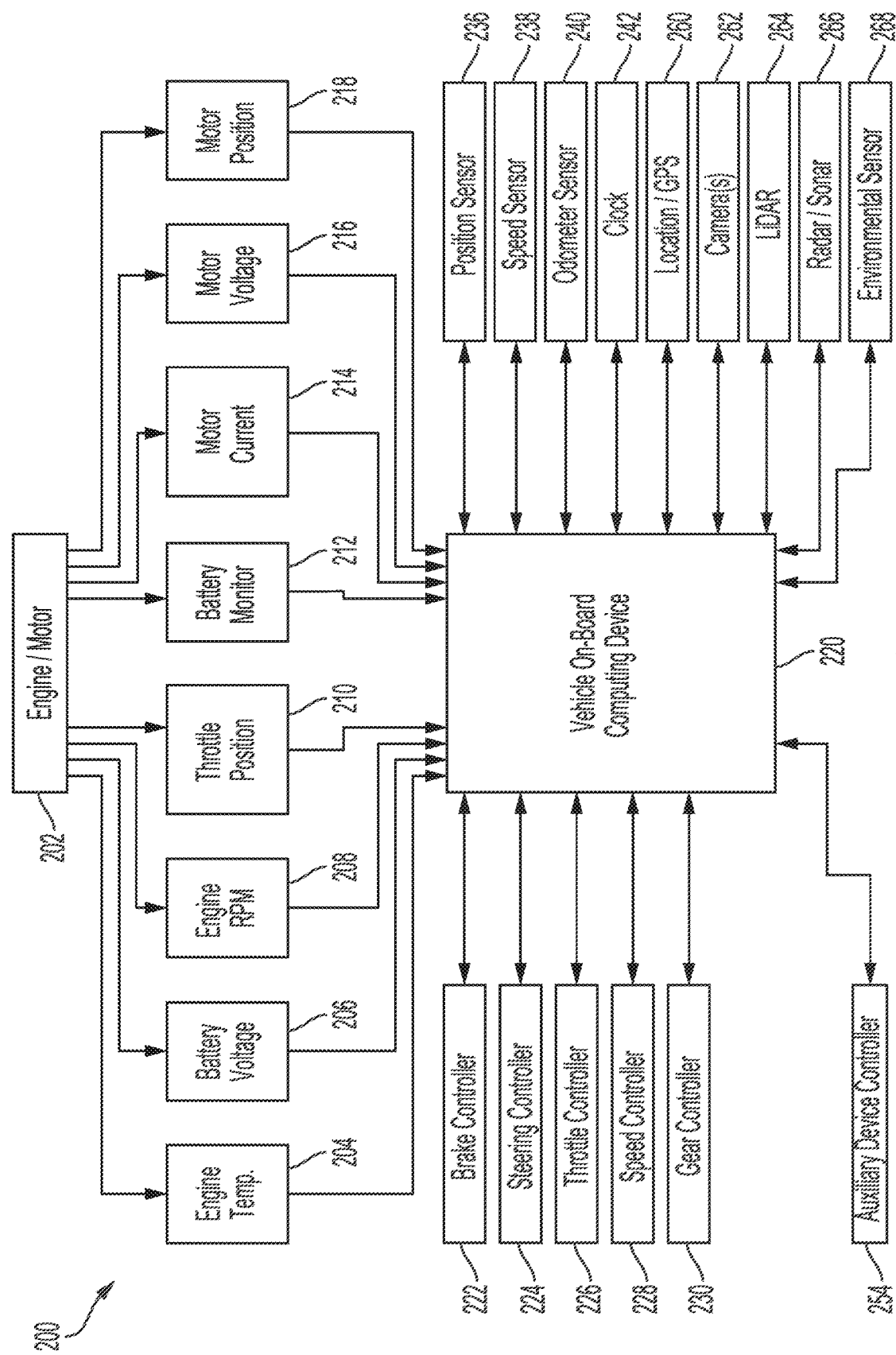
FIG. 2 is diagram of non-limiting embodiments or aspects of architecture for a vehicle.

Referring now to FIG. 2, FIG. 2 is a diagram of non-limiting embodiments or aspects of a system architecture 200 for a vehicle. Autonomous vehicle 102 may include a same or similar system architecture as that of system architecture 200 shown in FIG. 2.

As shown in FIG. 2, system architecture 200 may include engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine Rotations Per Minute ("RPM") sensor 208, and/or throttle position sensor 210. In an electric or hybrid vehicle, the vehicle may have an electric motor, and may have sensors such as battery monitoring sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236 such as an accelerometer, gyroscope and/or inertial measurement unit; speed sensor 238; and/or odometer sensor 240. System architecture 200 may include clock 242 that the system 200 uses to determine vehicle time during operation. Clock 242 may be encoded into the vehicle on-board computing device 220, it may be a separate device, or multiple clocks may be available.

System architecture 200 may include various sensors that operate to gather information about an environment in which the vehicle is operating and/or traveling. These sensors may include, for example: location sensor 260 (e.g., a Global Positioning System ("GPS") device); object detection sensors such as one or more cameras 262; LiDAR sensor system 264; and/or radar and/or sonar system 266. The sensors may include environmental sensors 268 such as a precipitation sensor and/or ambient temperature sensor. The object detection sensors may enable the system architecture 200 to detect objects that are within a given distance range of the vehicle in any direction, and the environmental sensors 268 may collect data about environmental conditions within an area of operation and/or travel of the vehicle.

During operation of system architecture 200, information is communicated from the sensors of system architecture 200 to on-board computing device 220. On-board computing device 220 analyzes the data captured by the sensors and optionally controls operations of the vehicle based on results of the analysis. For example, on-board computing device 220 may control: braking via a brake controller 222; direction via steering controller 224; speed and acceleration via throttle controller 226 (e.g., in a gas-powered vehicle) or motor speed controller 228 such as a current level controller (e.g., in an electric vehicle); differential gear controller 230 (e.g., in vehicles with transmissions); and/or other controllers such as auxiliary device controller 254.

Geographic location information may be communicated from location sensor 260 to on-board computing device 220, which may access a map of the environment that corresponds to the location information to determine known fixed features of the environment such as streets, buildings, stop signs and/or stop/go signals. Captured images from cameras 262 and/or object detection information captured from sensors such as LiDAR sensor system 264 is communicated from those sensors to on-board computing device 220. The object detection information and/or captured images are processed by on-board computing device 220 to detect objects in proximity to the vehicle. Any known or to be known technique for making an object detection based on sensor data and/or captured images can be used in the embodiments disclosed in this document.

Figure 3:
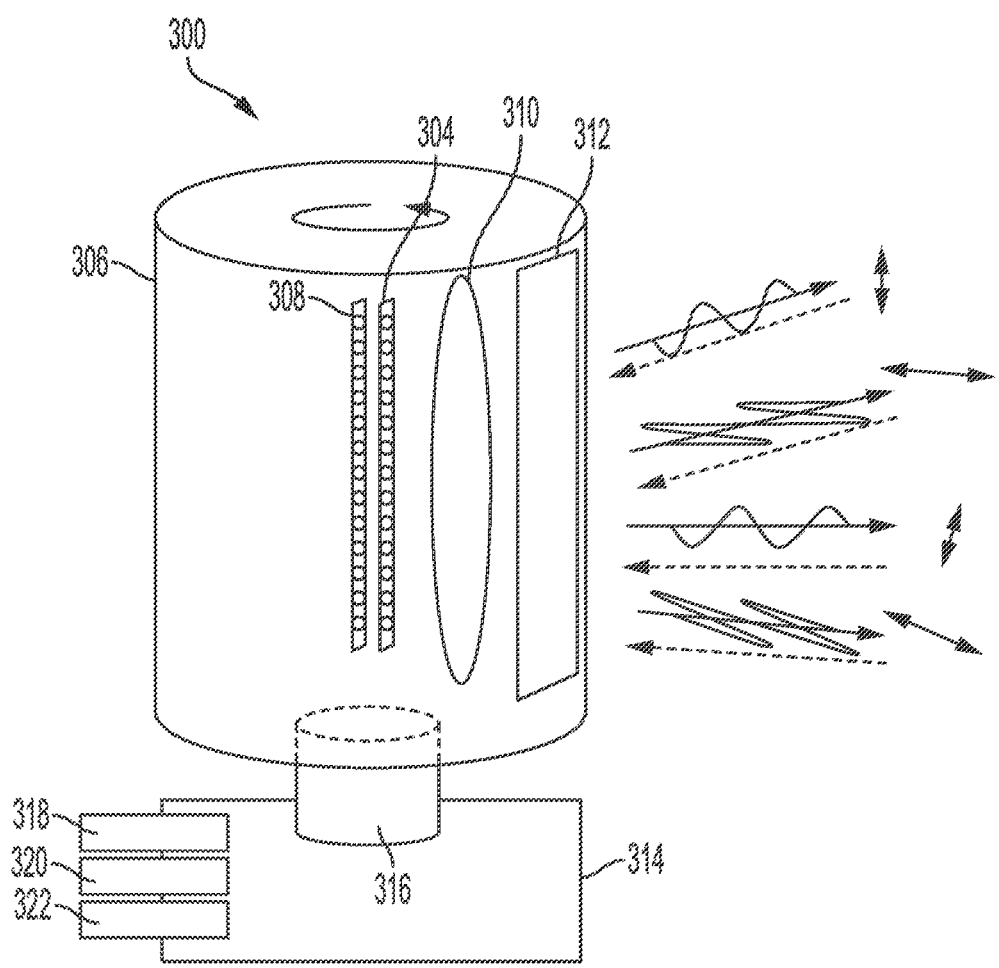
FIG. 3 is an illustration of non-limiting embodiments or aspects of an architecture for a LiDAR system.

Referring now to FIG. 3, FIG. 3 is an illustration of non-limiting embodiments or aspects of a LiDAR system 300. LiDAR sensor system 264 of FIG. 2 may be the same as or substantially similar to LiDAR system 300.

As shown in FIG. 3, LiDAR system 300 may include housing 306, which may be rotatable 360° about a central axis such as hub or axle 315. Housing 306 may include an emitter/receiver aperture 312 made of a material transparent to light. Although a single aperture is shown in FIG. 2, non-limiting embodiments or aspects of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Light emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Light emitter system 304 and light detector 308 may rotate with the rotating shell, or light emitter system 304 and light detector 308 may rotate inside the stationary dome of housing 306. One or more optical element structures 310 may be positioned in front of light emitter system 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments or aspects, multiple optical element structures 310 may be arranged in an array on or integral with the shell portion of housing 306.

In some non-limiting embodiments or aspects, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power the light emitter system 304, motor 316, and electronic components. LiDAR system 300 may include an analyzer 314 with elements such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with the LiDAR system 300 as shown, or some or all of analyzer 314 may be external to LiDAR system 300 and communicatively connected to LiDAR system 300 via a wired and/or wireless communication network or link.

Figure 4:
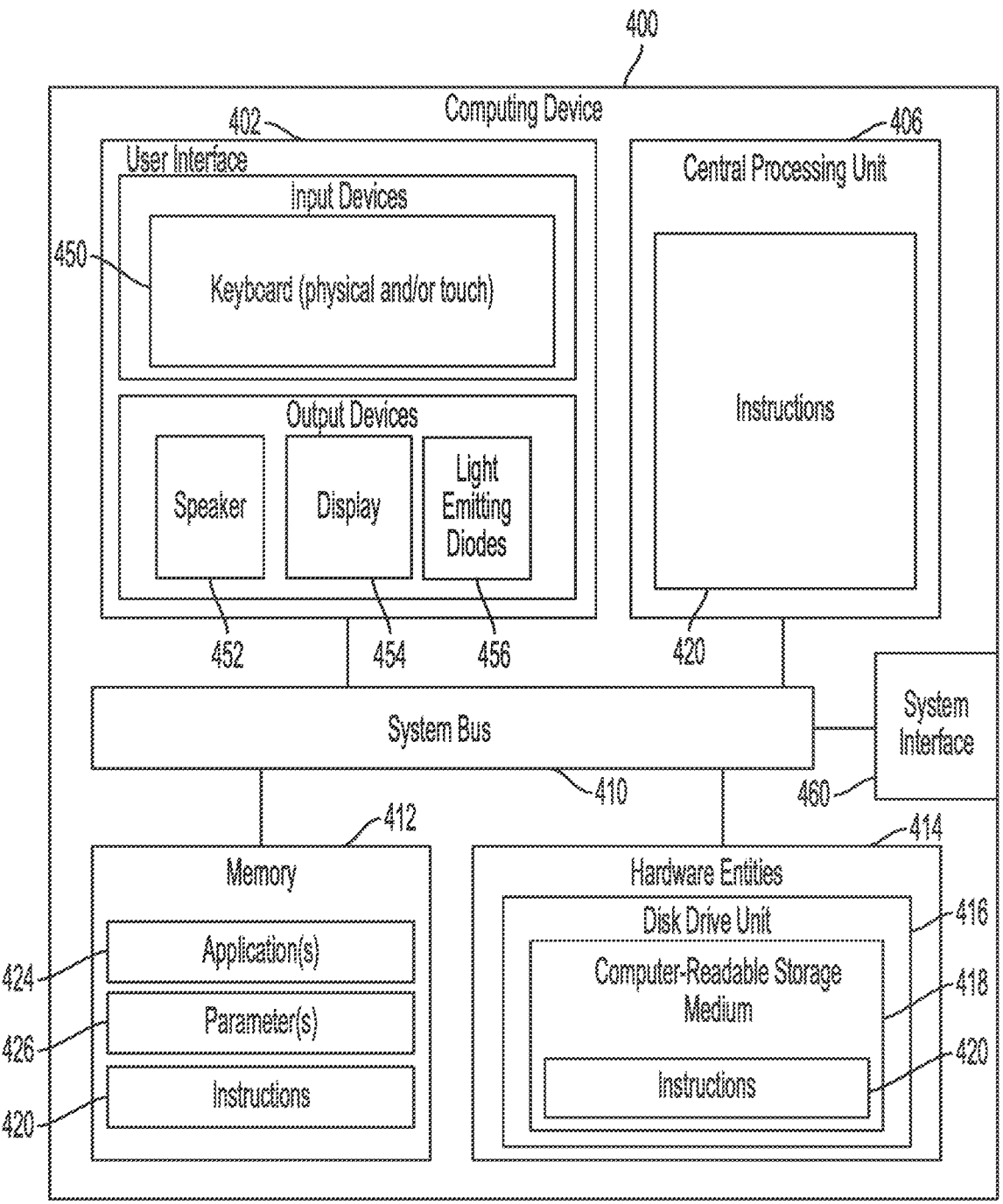
FIG. 4 is a diagram of non-limiting embodiments or aspects of a computing device.

Referring now to FIG. 4, FIG. 4 is a diagram of non-limiting embodiments or aspects a computing device 400. Computing device 400 can correspond to one or more devices of (e.g., one or more devices of a system of) autonomous vehicle 102 (e.g., one more devices of systems architecture 200, etc.) and/or one or more devices of map system 104. In some non-limiting embodiments or aspects, one or more devices of (e.g., one or more devices of a system of) autonomous vehicle 102 (e.g., one or more devices of system architecture 200, etc.) and/or one or more devices of map system 104 can include at least one computing device 400 and/or at least one component of computing device 400.

The number and arrangement of components shown in FIG. 4 are provided as an example. In some non-limiting embodiments or aspects, computing device 400 may include additional components, fewer components, different components, or differently arranged components than those shown in FIG. 4. Additionally, or alternatively, a set of components (e.g., one or more components) of computing device 400 may perform one or more functions described as being performed by another set of components of device 400.

As shown in FIG. 4, computing device 400 comprises user interface 402, Central Processing Unit ("CPU") 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of the computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes such as access points, etc.).

At least some of hardware entities 414 may perform actions involving access to and use of memory 412, which can be a Random Access Memory ("RAM"), a disk drive, flash memory, a Compact Disc Read Only Memory ("CD-ROM") and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, applications 424, and/or parameters 426 can also reside, completely or at least partially, within memory 412 and/or within CPU 406 during execution and/or use thereof by computing device 400. Memory 412 and CPU 406 may include machine-readable media. The term "machine-readable media", as used here, may refer to a single medium or multiple media (e.g., a centralized or distributed database, and/or associated caches and server) that store the one or more sets of instructions 420. The term "machine readable media", as used here, may refer to any medium that is capable of storing, encoding or carrying a set of instructions 420 for execution by computing device 400 and that cause computing device 400 to perform any one or more of the methodologies of the present disclosure.

Figure 5:
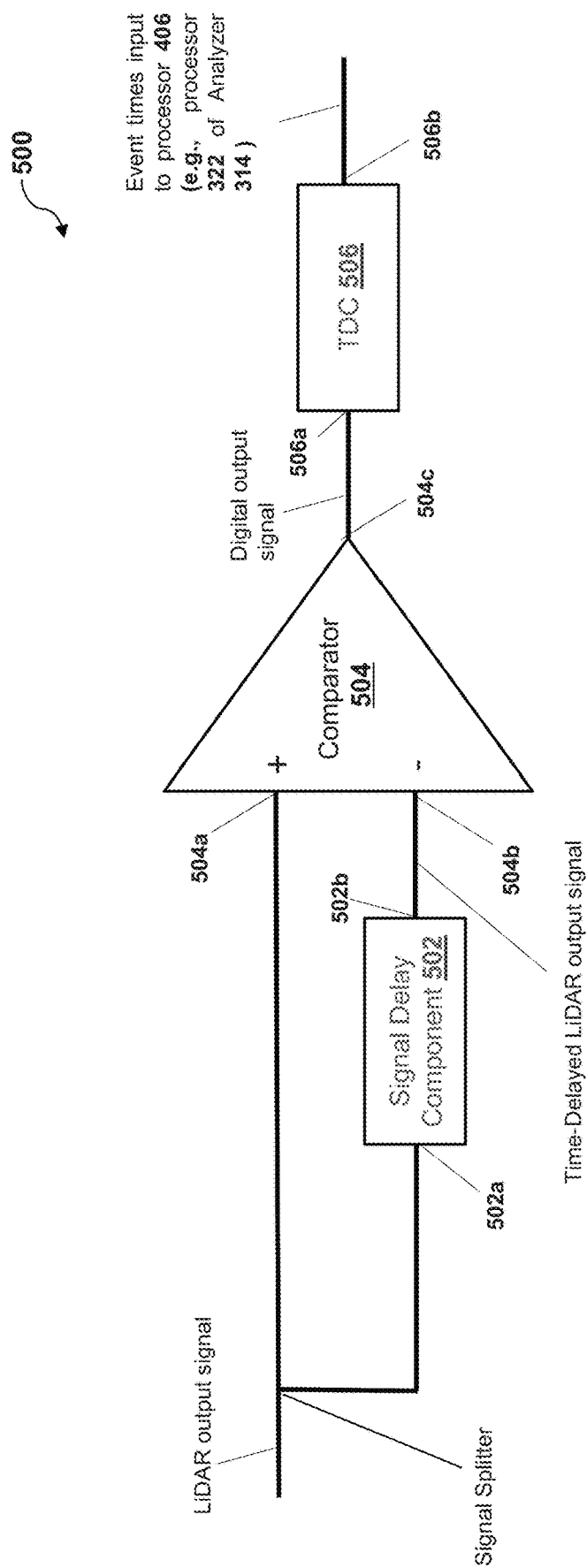
FIG. 5 is a diagram of non-limiting embodiments or aspects of a system for differential comparator-based time-of-flight measurement with amplitude estimation.

Referring now to FIG. 5, FIG. 5 is a diagram of non-limiting embodiments or aspects of a system 500 for differential comparator-based time-of-flight measurement with amplitude estimation. In some non-limiting embodiments or aspects, system 500 may be implemented within and/or as a part of analyzer 314 of LiDAR system 300.

As shown in FIG. 5, system 500 may include signal delay component 502, differential comparator 504, time-to-digital converter (TDC) 506, and/or a processor 406 (e.g., processor 322 of analyzer 314 of LiDAR system 300, vehicle on-board computing device 220 of system architecture 200, etc.).

Signal delay component 502 may be configured to receive, at delay input 502a, a LiDAR output signal including an analog waveform from a LiDAR system (e.g., LiDAR system 300, etc.), and provide, at delay output 502b, a time-delayed LiDAR output signal including a time-delayed analog waveform. For example, signal delay component 502 may be configured to generate, based on a LiDAR output signal including an analog waveform, a time-delayed LiDAR output signal including a time-delayed analog waveform. In some non-limiting embodiments or aspects, signal delay component 502 may include a delay line, such as an all-pass filter. As an example, LiDAR system 300 may include a receiver unit configured to receive light, and generate, based on the received light, the LiDAR output signal including the analog waveform.

Differential comparator 504 may be configured to receive, at first comparator input 504a (e.g., a positive comparator input, etc.), the LiDAR output signal including the analog waveform, receive, at second comparator input 504b (e.g., a negative comparator input, etc.), the time-delayed LiDAR output signal including the time-delayed analog waveform, and provide, at comparator output 504c, a digital output signal. For example, differential comparator 504 may be configured to generate, based on a LiDAR output signal including an analog waveform and a time-delayed LiDAR output signal including a time-delayed analog waveform, a digital output signal. As an example, differential comparator 504 may compare a delayed version of a LiDAR output signal to a real-time version of the LiDAR output signal.

As shown in FIG. 5, system 500 may include a circuit configured to split a LiDAR output signal including an analog waveform from a LiDAR system. For example, system 500 may include a signal splitter or other circuit component configured to receive, at a splitter input, the LiDAR output signal including the analog waveform, provide, at a first splitter output, connected to first comparator input 504a, the LiDAR output signal including the analog waveform, and provide, at a second splitter output connected to delay input 502a, the LiDAR output signal including the analog waveform.

Figure 6:
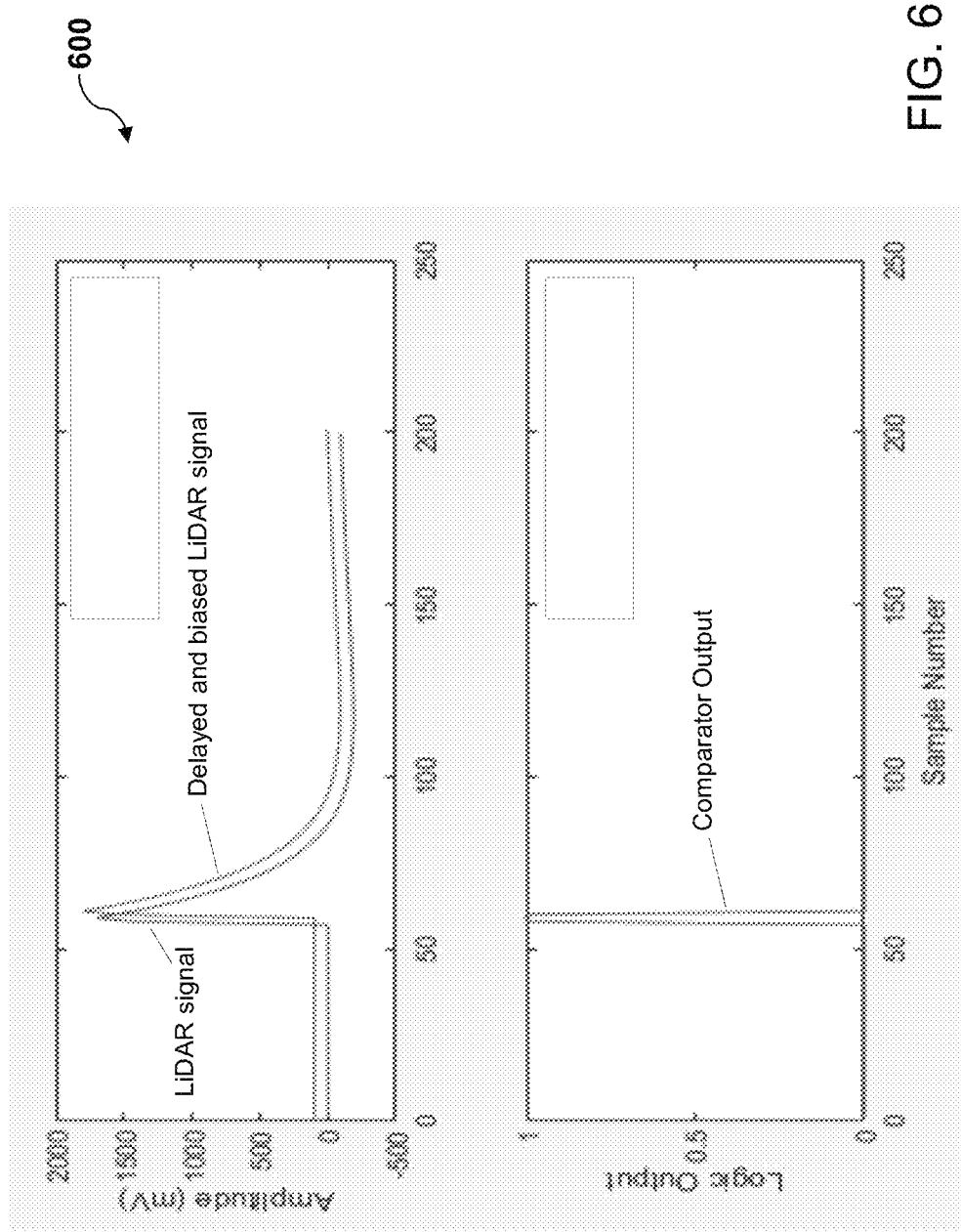
FIG. 6 shows graphs representing an example LiDAR signal and delayed LiDAR signal with respect to an example comparator output.
Figure 7:
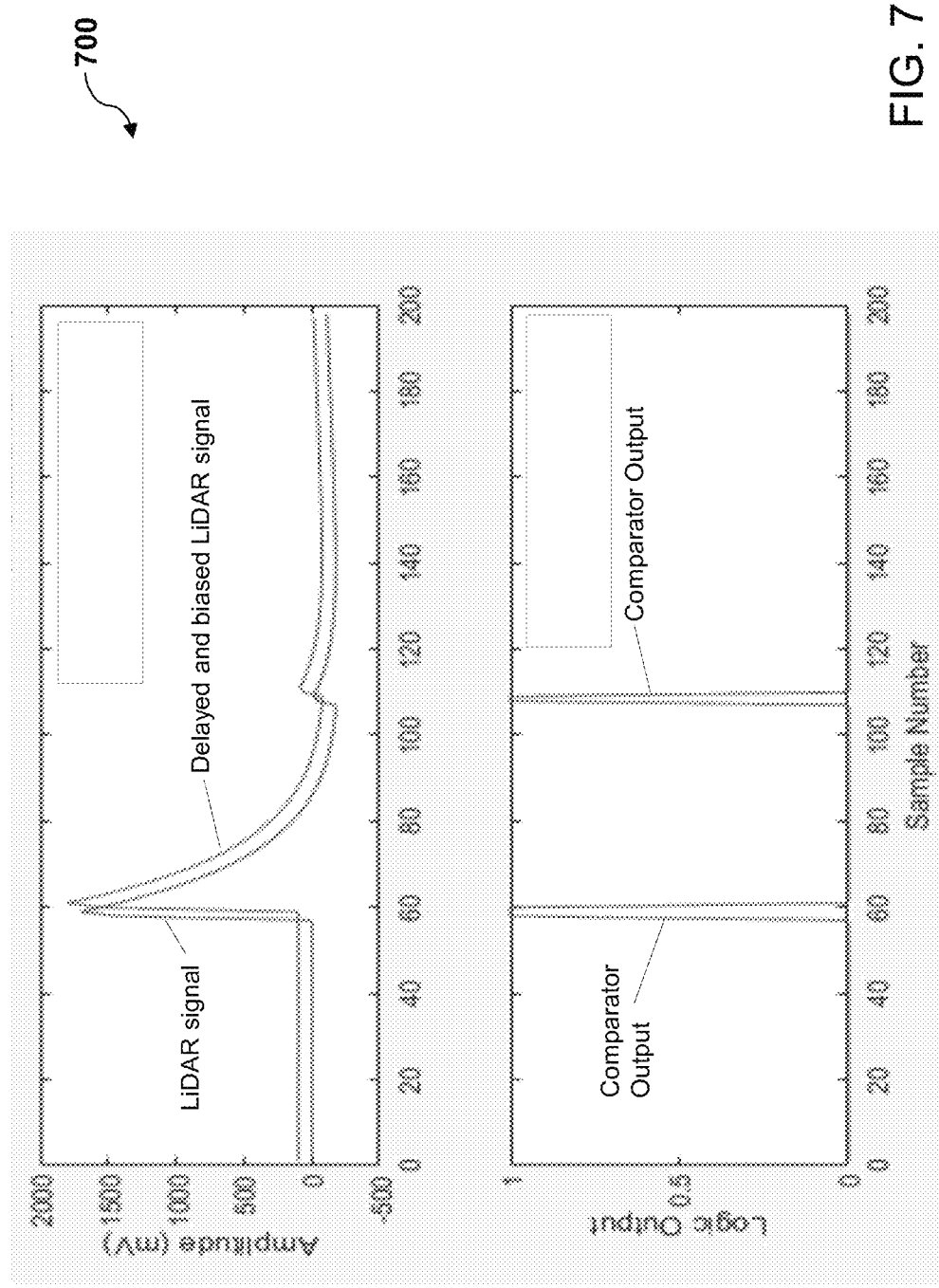
FIG. 7 shows graphs representing an example LiDAR signal and delayed LiDAR signal with respect to an example comparator output.

In some non-limiting embodiments or aspects, at least one of a hysteresis of differential comparator 504 and the time-delayed LiDAR output signal including the time-delayed analog waveform may be biased in a positive direction to provide for noise immunity. For example, and referring also to graphs 600 and 700 shown in FIGS. 6 and 7, by providing for noise immunity, differential comparator 504 may register a logic '1' when the LiDAR output signal including the analog waveform (e.g., the real-time signal, etc.) exceeds the time-delayed LiDAR output signal including the time-delayed analog waveform plus the bias, which only occurs when the real-time signal is rising sharply. As an example, and still referring to graphs 600 and 700 shown in FIGS. 6 and 7, when the real-time signal is not rising, the time-delayed signal "catches up" with the real-time signal and becomes greater than the real time signal, which results in differential comparator 504 registering a logic '0'.

TDC 506 may be configured to determine a first time associated with a rising edge of a digital output signal and a second time associated with the falling edge of a digital output signal. For example, TDC 506 may receive, at a TDC input 506a connected to comparator output 504c, the digital output signal, and provide, at TDC output 506b connected to processor 406, event times associated with rising and falling edges of the digital output signal. As an example, TDC 506 may record the rising and falling edges of the digital output signal (e.g., the comparator signal, etc.).

Processor 406 may be configured to determine, based on a first time associated with a rising edge of the digital output signal, a distance associated with the LiDAR output signal. For example, a rising edge of the digital output signal may be proportional to a distance or range measured by the LiDAR output signal. As an example, processor 406 may determine a distance of an object that reflected the light that generated the LiDAR output signal by multiplying a time period between the first time associated with the rising edge of the digital output signal and a time at which the light was emitted from LiDAR system 300 by a constant (e.g., the speed of light, etc.) and dividing the result by two and/or by using a more complicated model.

Processor 406 may be configured to determine, based on a time difference between the first time associated with the rising edge of the digital output signal and a second time associated with a falling edge of the digital output signal, an amplitude associated with the LiDAR output signal. For example, a difference between the rising edge and a corresponding falling edge may be proportional to an amount of delay between the two signals plus how long the signal was rising, which itself may be proportional to an amplitude or intensity of the LiDAR output signal. As an example, processor 406 may determine an amplitude or intensity of the LiDAR output signal, which may be proportional to a reflectivity of the object that reflected the light that generated the LiDAR output signal, as the time difference (e.g., how long the digital output signal is high, etc.) multiplied by a constant and/or by using a more complicated model.

Processor 406 may be further configured to generate LiDAR data including a distance associated with the LiDAR output signal and an amplitude associated with the LiDAR output signal, the distance being based on a first time associated with a rising edge of the digital output signal, and the amplitude being based on a time difference between the first time associated with the rising edge of the digital output signal and a second time associated with a falling edge of the digital output signal.

Processor 406 may be configured to detect, based on the LiDAR data, an object in an environment surrounding the LiDAR system. For example, processor 406 may generate a LiDAR point cloud including the LiDAR data, and processor 406 may apply one or more object recognition techniques to the LiDAR point cloud to detect an object and/or a type of the object in the LiDAR point cloud based on distances and amplitudes associated with points in the LiDAR point cloud.

Processor 406 may be further configured to control, based on the detected object, (e.g., based on the LiDAR data, based on the distance and the amplitude associated with the LiDAR output signal, etc.), at least one autonomous driving operation of an autonomous vehicle. For example, autonomous vehicle 102 (e.g., system architecture 200, etc.) may control, based on the detected object, at least one autonomous driving operation of autonomous vehicle 102 (e.g., control autonomous vehicle 102 to slow down, speed up, or bias lateral positioning within a lane or roadway, etc.).

Non-limiting embodiments or aspects of the present disclosure further enable subsequent return signals (e.g., events after a first rising edge and a corresponding first falling edge of the LiDAR signal, etc.) that occur while a LiDAR detector is still recharging from a previous return to be detected, and with proper amplitude estimation, despite the floor of the signal being significantly raised. For example, referring again to FIG. 7, which shows an example comparator output for multiple shots of LiDAR system 300, a later or second shot, despite being much smaller and with an amplitude of less than zero, may also be detected accurately. In contrast, such a subsequent return signal cannot be accurately detected by a thresholding system. Non-limiting embodiments or aspects of the present disclosure also provide a system that is relatively insensitive to a dynamic noise floor and, if properly implemented, is relatively inexpensive, while retaining the ability to measure amplitude.

Figure 8:
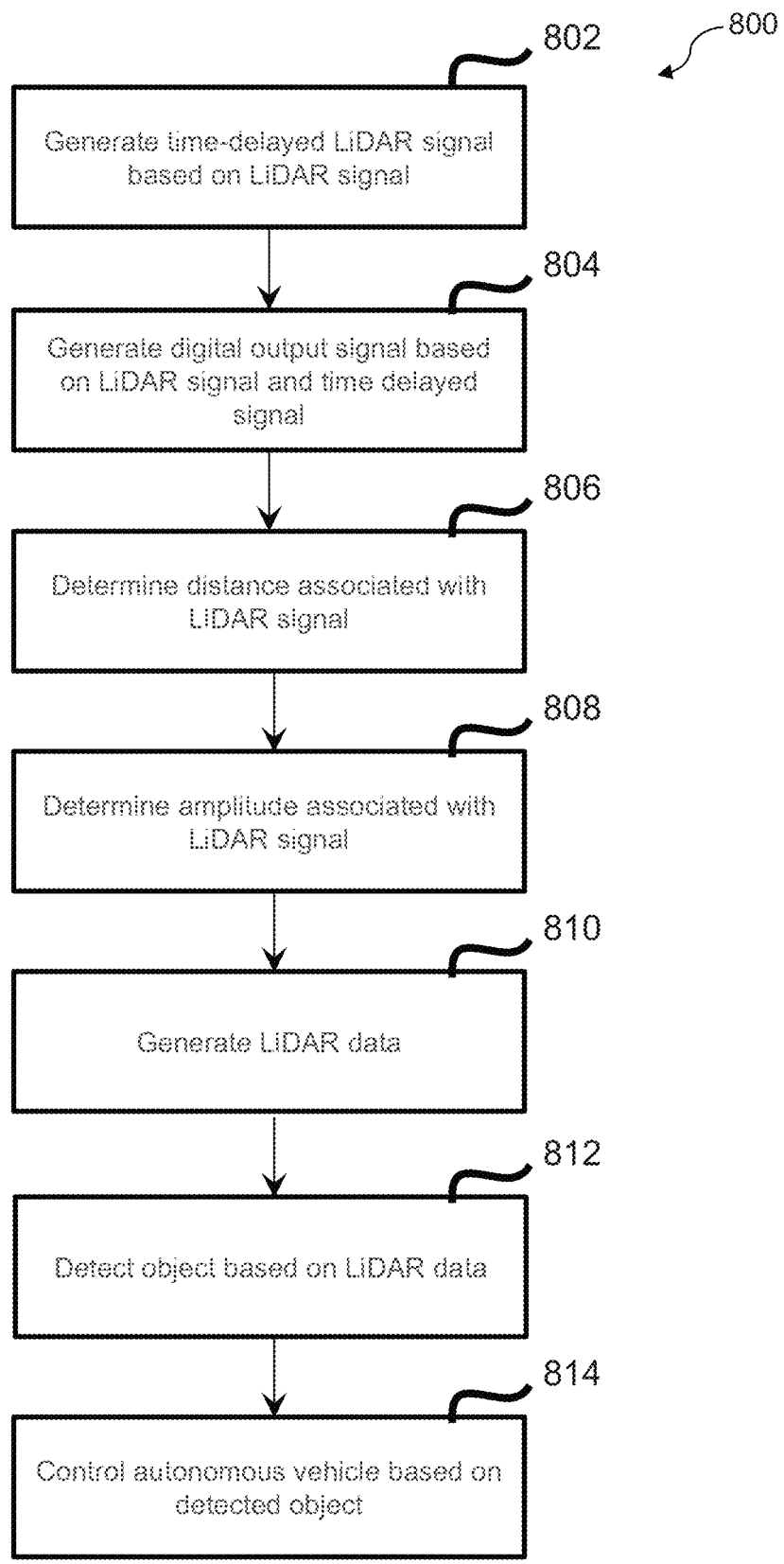
FIG. 8 is a flowchart of non-limiting embodiments or aspects of a process for differential comparator-based time-of-flight measurement with amplitude estimation.

Referring now to FIG. 8, FIG. 8 is a flowchart of non-limiting embodiments or aspects of a process 800 for differential comparator-based time-of-flight measurement with amplitude estimation. In some non-limiting embodiments or aspects, one or more of the steps of process 800 may be performed (e.g., completely, partially, etc.) by LiDAR system 300 (e.g., one or more devices of a system of autonomous vehicle 102, etc.). In some non-limiting embodiments or aspects, one or more of the steps of process 800 may be performed (e.g., completely, partially, etc.) by another device or a group of devices separate from or including LiDAR system 300, such as system architecture 200.

As shown in FIG. 8, at step 802, process 800 includes generating a time-delayed LiDAR output signal based on a LiDAR output signal. For example, LiDAR system 300 may generate, with signal delay component 502, based on a LiDAR output signal including an analog waveform, a time-delayed LiDAR output signal including a time-delayed analog waveform.

In some non-limiting embodiments or aspects, signal delay component 502 may include a delay line.

As shown in FIG. 8, at step 804, process 800 includes generating a digital output signal based on a LiDAR output signal and a time-delayed LiDAR output signal. For example, LiDAR system 300 may generate, with differential comparator 504, based on the LiDAR output signal including the analog waveform and the time-delayed LiDAR output signal including the time-delayed analog waveform, a digital output signal. As an example, a receiver unit of LiDAR system 300 may receive light and generate, with the receiver unit, based on the received light, the LiDAR output signal including the analog waveform.

In some non-limiting embodiments or aspects, LiDAR system 300 may split, with a signal splitter, the LiDAR output signal including the analog waveform to provide the LiDAR output signal including the analog waveform to each of the differential comparator 504 and the signal delay component 502.

In some non-limiting embodiments or aspects, at least one of a hysteresis of differential comparator 504 and the time-delayed LiDAR output signal including the time-delayed analog waveform is biased (e.g., buffered, etc.) in a positive direction.

As shown in FIG. 8, at step 806, process 800 includes determining a distance associated with a LiDAR output signal. For example, LiDAR system 300 may determine, based on a first time associated with a rising edge of the digital output signal, a distance associated with the LiDAR output signal.

As shown in FIG. 8, at step 808, process 800 includes determining an amplitude associated with a LiDAR output signal. For example, LiDAR system 300 may determine, based on a time difference between the first time associated with the rising edge of the digital output signal and a second time associated with a falling edge of the digital output signal, an amplitude associated with the LiDAR output signal.

In some non-limiting embodiments or aspects, determining the distance and/or the amplitude includes determining, with a time-to-digital converter (TDC), the first time associated with the rising edge of the digital output signal and the second time associated with the falling edge of the digital output signal.

As shown in FIG. 8, at step 810, process 800 includes generating LiDAR data including a distance associated with the LiDAR output signal and an amplitude associated with the LiDAR output signal, the distance being based on a first time associated with a rising edge of the digital output signal, and the amplitude being based on a time difference between the first time associated generate with the rising edge of the digital output signal and a second time associated with a falling edge of the digital output signal. For example, LiDAR system 300 may LiDAR data including a distance associated with the LiDAR output signal and an amplitude associated with the LiDAR output signal, the distance being based on a first time associated with a rising edge of the digital output signal, and the amplitude being based on a time difference between the first time associated generate with the rising edge of the digital output signal and a second time associated with a falling edge of the digital output signal.

As shown in FIG. 8, at step 812, process 800 includes detecting, based on LiDAR data, an object in an environment surrounding a LiDAR system. For example, system architecture 200 may detect, based on the LiDAR data, an object in an environment surrounding the LiDAR system.

As shown in FIG. 8, at step 814, process 800 includes controlling an autonomous vehicle based on a detected object. For example, system architecture 200 may control, based on the detected object (e.g., based on LiDAR data, based on a distance and an amplitude associated with a LiDAR output signal, etc.), at least one autonomous driving operation of autonomous vehicle 102.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A system, comprising:
   a signal delay component configured to: receive, at a delay input, a LiDAR output signal including an analog waveform from a LiDAR system, and provide, at a delay output, a time-delayed LiDAR output signal including a time-delayed analog waveform;
   a differential comparator configured to: receive, at a first comparator input, the LiDAR output signal including the analog waveform, receive, at a second comparator input, the time-delayed LiDAR output signal including the time-delayed analog waveform, and provide, at a comparator output, a digital output signal; and
   at least one processor configured to generate LiDAR data including a distance associated with the LiDAR output signal and an amplitude associated with the LiDAR output signal, the distance being based on a first time associated with a rising edge of the digital output signal, and the amplitude being based on a time difference between the first time and a second time associated with a falling edge of the digital output signal.

2. The system of claim 1, wherein the signal delay component includes a delay line.

3. The system of claim 1, wherein at least one of a hysteresis of the differential comparator and the time-delayed LiDAR output signal including the time-delayed analog waveform is biased in a positive direction.

4. The system of claim 1, further comprising:
   a time-to-digital converter (TDC) configured to determine the first time and the second time.

5. The system of claim 1, further comprising:
   the LiDAR system, wherein the LiDAR system includes a receiver unit configured to receive light, and generate, based on the received light, the LiDAR output signal including the analog waveform.

6. The system of claim 1, further comprising:
   a signal splitter configured to receive, at a splitter input, the LiDAR output signal including the analog waveform, provide, at a first splitter output, connected to the first comparator input, the LiDAR output signal including the analog waveform, and provide, at a second splitter output connected to the delay input, the LiDAR output signal including the analog waveform.

7. The system of claim 6 wherein the at least one processor is further configured to:
   detect, based on the LiDAR data, an object in an environment surrounding the LiDAR system.

8. The system of claim 7, wherein the at least one processor is further configured to:
   issue a command to control, based on the detected object, at least one autonomous driving operation of an autonomous vehicle.

9. The system of claim 1, further comprising:
   at least one photodetector configured to receive light reflected back into the LiDAR system, wherein the at least one photodetector is configured to generate the LiDAR output signal including the analog waveform.

10. A method, comprising:
    generating, with a signal delay component, based on a LiDAR output signal including an analog waveform, a time-delayed LiDAR output signal including a time-delayed analog waveform;
    generating, with a differential comparator, based on the LiDAR output signal including the analog waveform and the time-delayed LiDAR output signal including the time-delayed analog waveform, a digital output signal; and
    generating, with at least one processor, LiDAR data including a distance associated with the LiDAR output signal and an amplitude associated with the LiDAR output signal, the distance being based on a first time associated with a rising edge of the digital output signal, and the amplitude being based on a time difference between the first time and a second time associated with a falling edge of the digital output signal.

11. The method of claim 10, wherein the signal delay component includes a delay line.

12. The method of claim 10, wherein at least one of a hysteresis of the differential comparator and the time-delayed LiDAR output signal including the time-delayed analog waveform is biased in a positive direction.

13. The method of claim 10, further comprising:
determining, with a time-to-digital converter (TDC), the first time associated with the rising edge of the digital output signal and the second time associated with the falling edge of the digital output signal.

14. The method of claim 10, further comprising:
receiving, with a receiver unit of a LiDAR system, light; and
generating, with the receiver unit, based on the received light, the LiDAR output signal including the analog waveform.

15. The method of claim 10, further comprising:
receiving, with a signal splitter, at a splitter input, the LiDAR output signal including the analog waveform;
providing, with the signal splitter, a first splitter output, connected to a first comparator input, the LiDAR output signal including the analog waveform; and
providing, with the signal splitter, at a second splitter output connected to a delay input, the LiDAR output signal including the analog waveform.

16. The method of claim 10, further comprising:
detecting, based on the LiDAR data, an object in an environment surrounding a LiDAR system.

17. The method of claim 16, further comprising:
issuing, with the at least one processor, based on the LiDAR data, a command to control at least one autonomous driving operation of an autonomous vehicle.

18. The method of claim 10, further comprising:
receiving, with at least one photodetector, light reflected back into a LiDAR system; and
generating, with the at least one photodetector, the LiDAR output signal including the analog waveform.

19. A system implemented in an autonomous vehicle, comprising:
a LiDAR system configured to generate a LiDAR output signal including an analog waveform;
a signal delay component configured to: receive, at a delay input, the LiDAR output signal including the analog waveform, and provide, at a delay output, a time-delayed LiDAR output signal including a time-delayed analog waveform;
a differential comparator configured to: receive, at a first comparator input, the LiDAR output signal including the analog waveform, receive, at a second comparator input, the time-delayed LiDAR output signal including the time-delayed analog waveform, and provide, at a comparator output, a digital output signal; and
at least one processor configured to:
generate LiDAR data including a distance associated with the LiDAR output signal and an amplitude associated with the LiDAR output signal, the distance being based on a first time associated with a rising edge of the digital output signal, and the amplitude being based on a time difference between the first time and a second time associated with a falling edge of the digital output signal;
detect, based on the LiDAR data, an object in an environment surrounding the autonomous vehicle; and
issue, based on the detected object, a command to control at least one autonomous driving operation of the autonomous vehicle.

20. The system of claim 19, wherein the LiDAR system includes a receiver unit configured to receive light, and generate, based on the received light, the LiDAR output signal including the analog waveform.

* * * * *